(12) United States Patent
Chang et al.

(10) Patent No.: US 10,712,500 B2
(45) Date of Patent: Jul. 14, 2020

(54) SEMICONDUCTOR DEVICE AND MANUFACTURING METHOD OF THE SAME

(71) Applicant: TAIWAN SEMICONDUCTOR MANUFACTURING COMPANY LTD., Hsinchu (TW)

(72) Inventors: Kai-Fung Chang, Taipei (TW); Lien-Yao Tsai, Hsinchu (TW); Chien Shih Tsai, Hsinchu County (TW); Shih-Che Hung, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 16/162,736

(22) Filed: Oct. 17, 2018

(65) Prior Publication Data

US 2020/0124790 A1  Apr. 23, 2020

(51) Int. Cl.
*G02B 6/12* (2006.01)
*G02B 6/124* (2006.01)
*G02B 6/136* (2006.01)

(52) U.S. Cl.
CPC ............ *G02B 6/124* (2013.01); *G02B 6/136* (2013.01); *G02B 2006/12107* (2013.01)

(58) Field of Classification Search
CPC ..................................................... G02B 6/12
USPC ......................................................... 385/37
See application file for complete search history.

(56) References Cited

U.S. PATENT DOCUMENTS

| | | | | |
|---|---|---|---|---|
| 5,238,531 A | * | 8/1993 | Macomber | G02B 6/124 219/121.6 |
| 5,241,556 A | * | 8/1993 | Macomber | H01S 5/187 372/46.01 |
| 5,307,183 A | * | 4/1994 | Macomber | G02B 5/32 359/11 |
| 5,345,466 A | * | 9/1994 | Macomber | H01S 5/187 372/102 |
| 6,383,824 B1 | * | 5/2002 | Lensing | G01B 11/30 257/E21.528 |
| 6,684,007 B2 | * | 1/2004 | Yoshimura | G02B 6/10 257/E23.01 |
| 8,165,436 B2 | * | 4/2012 | Mossberg | B29D 11/0074 385/131 |
| 9,466,739 B1 | * | 10/2016 | Brueck | H01L 31/02327 |
| 9,851,506 B2 | * | 12/2017 | Shi | G02B 6/134 |
| 2003/0020074 A1 | * | 1/2003 | Macomber | H01S 5/0201 257/79 |
| 2004/0203223 A1 | * | 10/2004 | Guo | H01L 21/76808 438/637 |
| 2005/0110157 A1 | * | 5/2005 | Sherrer | G02B 6/4201 257/776 |

(Continued)

*Primary Examiner* — Kaveh C Kianni
(74) *Attorney, Agent, or Firm* — WPAT, P.C., Intellectual Property Attorneys; Anthony King

(57) ABSTRACT

The present disclosure provides a semiconductor device, including a semiconductive substrate, a dielectric stack disposed over the semiconductive substrate to form a wall of a grating coupler opening, and an etch stopper interfacing with two sublayers of the dielectric stack and partially separating the interface of the two sublayers. The etch stopper has a resistance to a fluorine solution that is higher than that of the two sublayers. A method of manufacturing the semiconductor device is also provided.

20 Claims, 20 Drawing Sheets

(56) References Cited

U.S. PATENT DOCUMENTS

| | | | | |
|---|---|---|---|---|
| 2007/0254393 | A1* | 11/2007 | Johnson | H01S 5/024 |
| | | | | 438/38 |
| 2008/0116537 | A1* | 5/2008 | Adkisson | H01L 27/14618 |
| | | | | 257/448 |
| 2009/0246707 | A1* | 10/2009 | Li | G02B 6/124 |
| | | | | 430/314 |
| 2012/0104505 | A1* | 5/2012 | Henson | H01L 21/31111 |
| | | | | 257/369 |
| 2012/0270347 | A1* | 10/2012 | Yagi | H01S 5/1231 |
| | | | | 438/31 |
| 2013/0343524 | A1* | 12/2013 | Teshima | G01N 23/20008 |
| | | | | 378/71 |
| 2014/0254978 | A1* | 9/2014 | Koch | G02F 1/0018 |
| | | | | 385/14 |
| 2015/0021728 | A1* | 1/2015 | Huang | H01L 27/14667 |
| | | | | 257/432 |
| 2015/0125111 | A1* | 5/2015 | Orcutt | G02B 6/122 |
| | | | | 385/14 |
| 2015/0283743 | A1* | 10/2015 | Park | B29C 33/3842 |
| | | | | 216/41 |
| 2016/0218012 | A1* | 7/2016 | Shimamoto | H01L 21/02164 |
| 2016/0307939 | A1* | 10/2016 | Wang | H01L 27/1443 |
| 2017/0117369 | A1* | 4/2017 | Trautmann | H01L 29/41766 |
| 2017/0141539 | A1* | 5/2017 | Ring | G02B 6/12007 |
| 2018/0102442 | A1* | 4/2018 | Wang | G02B 1/005 |
| 2018/0204763 | A1* | 7/2018 | Wallace | H01L 21/0337 |
| 2018/0301373 | A1* | 10/2018 | Yashar | H01L 21/2855 |
| 2018/0323100 | A1* | 11/2018 | Nyhus | H01L 21/0337 |

* cited by examiner

SEMICONDUCTOR DEVICE AND MANUFACTURING METHOD OF THE SAME

BACKGROUND

Nanophotonic waveguides and components show great promise for use in the large-scale integration of photonic circuits. A grating coupler that is usually extended over the entire surface of the grating results in a combined structure sometimes called a grating waveguide structure. The basic waveguide grating structure is a periodic structure with a finite number of rectangular grating teeth.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
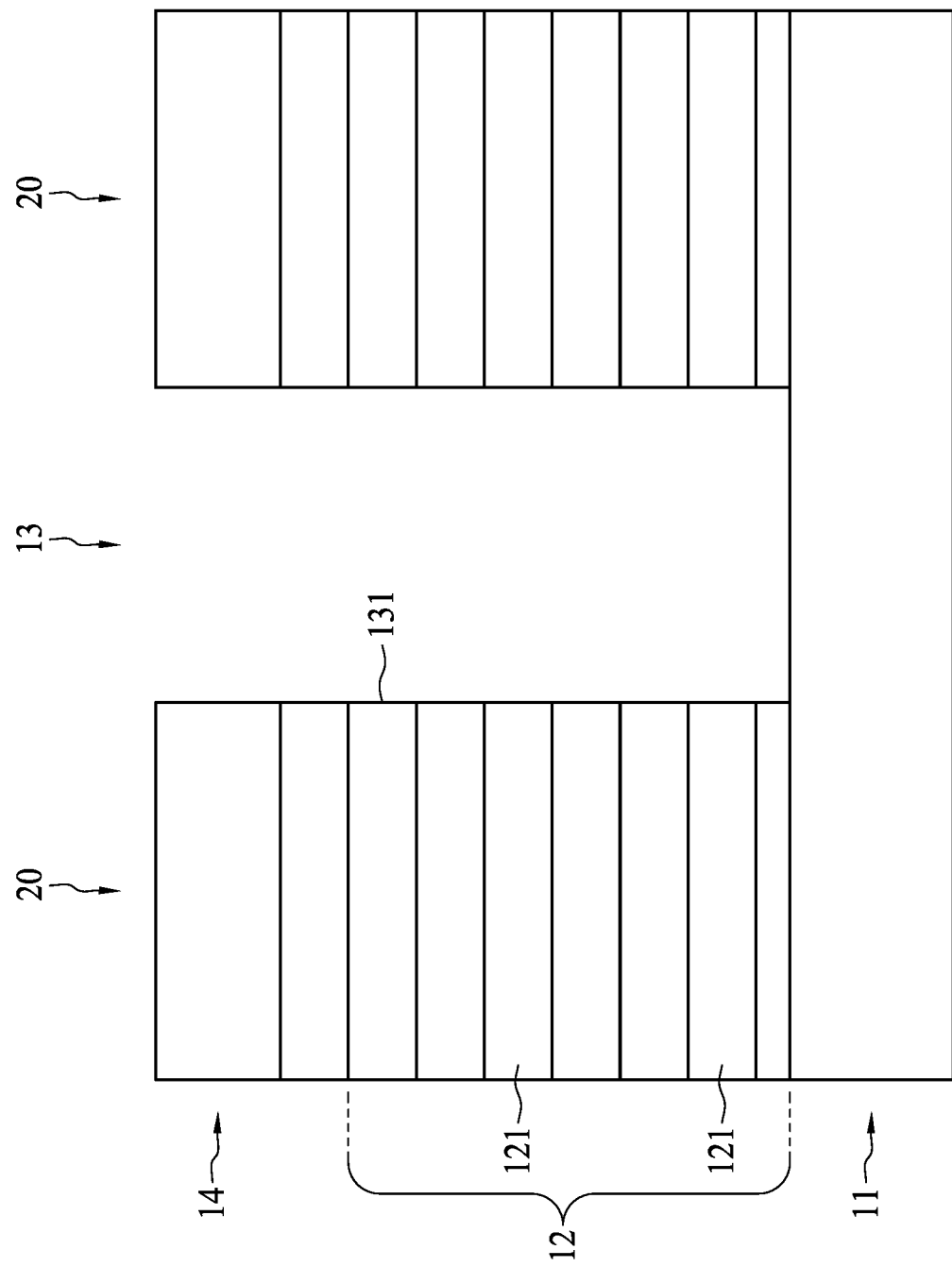
FIG. 1 is a cross-sectional view of a conventional semiconductor device.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

A semiconductor device, a waveguide structure and methods of manufacturing the same are provided. In particular, a semiconductor device with a grating coupler opening, grating coupler teeth and a plurality of etch stoppers embedded in each grating coupler tooth is described in detail below. In addition, methods of manufacturing a semiconductor device that utilizes a grating coupler opening, grating coupler teeth and a plurality of etch stoppers embedded in each grating coupler tooth is also provided below. Other features and processes may also be included.

Microelectronic device wafers are used to form integrated circuits. The microelectronic device wafer includes a substrate, made of a material such as silicon, into which regions are patterned for deposition of different materials having insulative, conductive or semi-conductive properties. In order to obtain the correct patterning, excess material used in forming the layers on the substrate must be removed. To fabricate functional and reliable circuitry, it is important to prepare a flat or planar microelectronic wafer surface prior to subsequent processing. Thus, it is necessary to remove and/or polish certain surfaces of a microelectronic device wafer.

FIG. 1 is a cross-sectional view illustrating a conventional semiconductor device. Referring to FIG. 1, the semiconductor device includes a waveguide structure. The waveguide structure includes a grating coupler opening 13 located between the adjacent grating coupler teeth 20, wherein each grating coupler tooth 20 is a dielectric stack 12 formed by a plurality of sublayers 121. Conventional approaches to integrating a waveguide structure within standard electronic processes typically involve using a plurality of dielectric layers, such as dielectric layers comprising polysilicon, single-crystalline silicon, or silicon nitride, within the in-foundry process; or depositing and patterning dielectric layers in the backend as a post-foundry process. Wet etching is a critical process step in integrated circuit manufacturing. Device construction is a multi-step repetitive process of lithography, etching, filling, and selective removal. However, if the wall of the grating coupler opening 13 is in contact with the etchant, such as a fluorine solution, the wall 131 of the grating coupler opening 13 may be deformed due to poor corrosion resistance of the dielectric material of the dielectric stack 12, or the etchant may penetrate between the sublayers 121 of the dielectric stack 12 to reduce the service life of the waveguide.

Before addressing illustrated embodiments specifically, advantageous features and certain aspects of the exemplary embodiments are discussed generally. General aspects of embodiments described herein include an etch stopper designed to prevent problems such as damage to the dielectric stack, reduced service life caused by the wet process, and other defects occurring in the waveguide structure.

Figure 2:
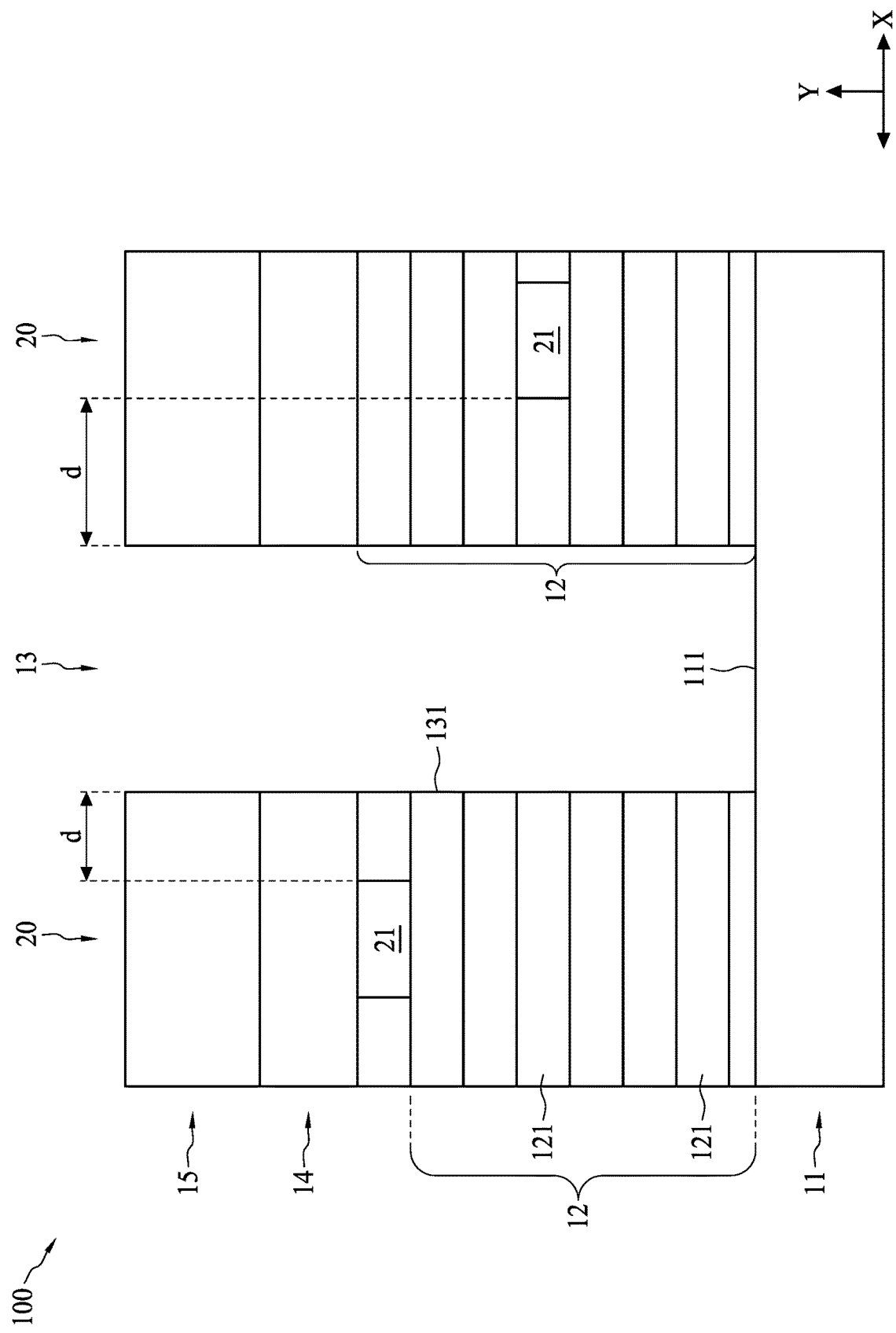
FIG. 2 is a cross-sectional view of a semiconductor device in accordance with some embodiments of the present disclosure.

FIG. 2 is a cross-sectional view illustrating a semiconductor device according to aspects of the present disclosure in some embodiments. Referring to FIG. 2, a semiconductor device 100 includes a semiconductive substrate 11 and a dielectric stack 12 over the semiconductive substrate 11 to form a wall 131 of a grating coupler opening 13. The waveguide structure 100 further includes an etch stopper 21 interfacing with two sublayers 121 of the dielectric stack 12 and partially separating the interface of the two sublayers 121, wherein the etch stopper 21 has a resistance to a fluorine solution that is higher than that of the two sublayers 121. In some embodiments, the semiconductor device 100 is a waveguide structure.

In some embodiments, the semiconductive substrate 11 includes polysilicon, silane ($SiH_4$), di-silane ($Si_2H_6$), or di-clorsilane ($SiCl_2H_4$), silicon germanium, gallium arsenic, or other suitable semiconductor materials so as to function as a conductive material under certain conditions. In some embodiments, the semiconductive substrate 11 further includes doped regions, such as a P-well, an N-well, and/or a doped active region such as a P+ doped active region. In some embodiments, the semiconductive substrate 11 may further include other features such as a buried layer and/or an epitaxy layer. Furthermore, the semiconductive substrate 11 may be a semiconductor on insulator such as silicon on insulator (SOI). In some embodiments, the semiconductor substrate 110 may include a doped epitaxy layer, a gradient semiconductor layer, and/or a semiconductor layer overlying another semiconductor layer of a different type such as a silicon layer on a silicon germanium layer. In some embodiments, the semiconductive substrate 11 may include a multilayer silicon structure or a multilayer compound semiconductor configuration. In some embodiments, the semiconductive substrate 11 includes an inter-layer dielectric (ILD) layer. In some embodiments, the ILD layer may be a silicon oxide layer or any suitable ILD layer.

The dielectric stack 12 is disposed over the semiconductive substrate 11. In some embodiments, the waveguide structure 100 includes a plurality of dielectric stacks 12. In some embodiments, the dielectric stack 12 is a low-k dielectric stack. The dielectric constant (k value) of the low-k dielectric stack may be lower than 3.0, or lower than about 2.5, and the dielectric stack is therefore also referred to as an extreme low-k (ELK) dielectric stack. The material for the dielectric stack 12 may include organic dielectric material such as organic silicate glass (OSG), porous methyl silsesquioxane (p-MSQ), hydrogen silsesquioxane (HSQ), a combination thereof, or any other suitable organic low-k or extreme low-k material. In some embodiments, the material for the dielectric stack 12 may include inorganic dielectric material such as carbon-doped silicon oxide, fluorine-doped silicate glass (FSG), a combination thereof, or any other suitable inorganic low-k or extreme low-k material. In some other embodiments, other suitable dielectric materials, such as silicon oxide or phosphosilicate glass (PSG), may also be used. In some embodiments, the dielectric stack 12 includes silicon oxide. In some embodiments, the dielectric stack 12 is arranged in a rectangle as seen from a top view, but the disclosure is not limited thereto.

FIG. 2 illustrates only two dielectric stacks 12 for clarity and simplicity, but such example is intended to be illustrative only, and is not intended to be limiting to the embodiments. A person ordinarily skilled in the art would readily understand that any suitable number of the dielectric stacks 12 may alternatively be utilized, and all such combinations are fully intended to be included within the scope of the embodiments. Additionally, while the dielectric stacks 12 are illustrated as having similar features, this is intended to be illustrative and is not intended to limit the embodiments, as the dielectric stacks 12 may have similar structures or different structures in order to meet the desired functional capabilities.

In some embodiments, the dielectric stack 12 includes a plurality of sublayers 121. In some embodiments, the dielectric material included in different sublayers 121 may be the same or different.

The grating coupler opening 13 is configured to receive light waves. The dielectric stack 12 forms a wall 131 of a grating coupler opening 13. In other words, the shape of the grating coupler opening 13 is determined by the wall 131. In some embodiments, the grating coupler opening 13 is surrounded by at least one dielectric stack 12. In some embodiments, the grating coupler opening 13 exposes a portion 111 of the semiconductive substrate 11. In other words, the shape of the grating coupler opening 13 is determined by the wall 131 and the semiconductive substrate 11. The configuration of the grating coupler opening 13 is adjusted according to actual needs. In some embodiments, the shape of the grating coupler opening 13 is a circular, oval, square, rectangular, rhomboid, or trapezoidal from the top view, but the disclosure is not limited thereto.

The etch stopper 21 is configured to prevent the waveguide structure 100 from being excessively damaged by the fluorine solution. The etch stopper 21 interfaces with two sublayers 121 of the dielectric stack 12, and has a resistance to the fluorine solution higher than that of the two sublayers 121. The material of the etch stopper 21 is not particularly limited. In some embodiments, the etch stopper 21 includes metal. In some embodiments, the etch stopper 21 includes Aluminum (Al), Chromium (Cr), Gold (Au), Molybdenum (Mo), Platinum (Pt), Tantalum (Ta), Titanium (Ti), Silver (Ag), Copper (Cu), Tungsten (W) and/or an alloy thereof.

In some embodiments, the distance (d) between the etch stopper 21 and the wall 131 of the grating coupler opening 13 along a first direction X parallel to the semiconductive substrate 11 is between 0.5 and 10 μm. When the waveguide structure 100 is in contact with the fluorine solution, a portion of the dielectric stack 12 located between the wall 131 of a grating coupler opening 13 and the etch stopper 21 may be etched, while the etch stopper 21 prevents the fluorine solution from continuing to erode the dielectric stack 12. Moreover, the etch stopper 21 located between sublayers 121 may prevent or stop moisture from penetrating into the dielectric stack 12.

In some embodiments, the maximum width of the etch stopper 21 along a first direction X parallel to the semiconductive substrate 11 is between 2 and 3 µm. In some embodiments, the shape of the etch stopper 21 from the top view is not particularly limited, and may be adjusted according to the shape of the dielectric stack 12 or actual needs.

FIG. 2 illustrates only one etch stopper 21 in each of the dielectric stacks 12 for clarity and simplicity, but such example is intended to be illustrative only, and is not intended to be limiting to the embodiments. A person ordinarily skilled in the art would readily understand that any suitable number of etch stoppers 21 may alternatively be utilized, and all such combinations are fully intended to be included within the scope of the embodiments. Additionally, while the etch stoppers 21 are illustrated as having similar features, this is intended to be illustrative and is not intended to limit the embodiments, as the different etch stoppers 21 may have similar structures or different structures in order to provide the desired functional capabilities.

Figure 3:
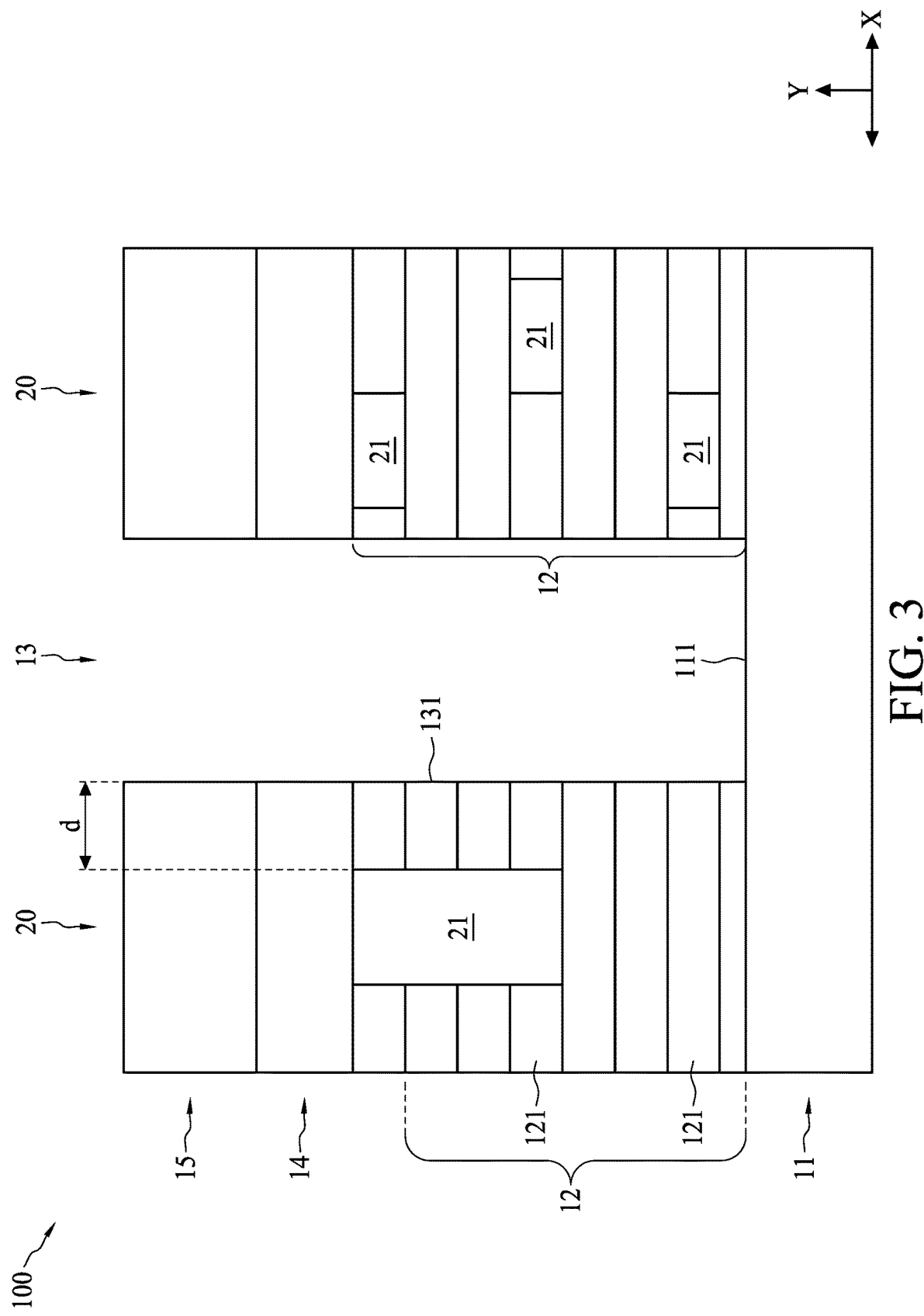
FIG. 3 is a cross-sectional view of a semiconductor device in accordance with some embodiments of the present disclosure.
Figure 4:
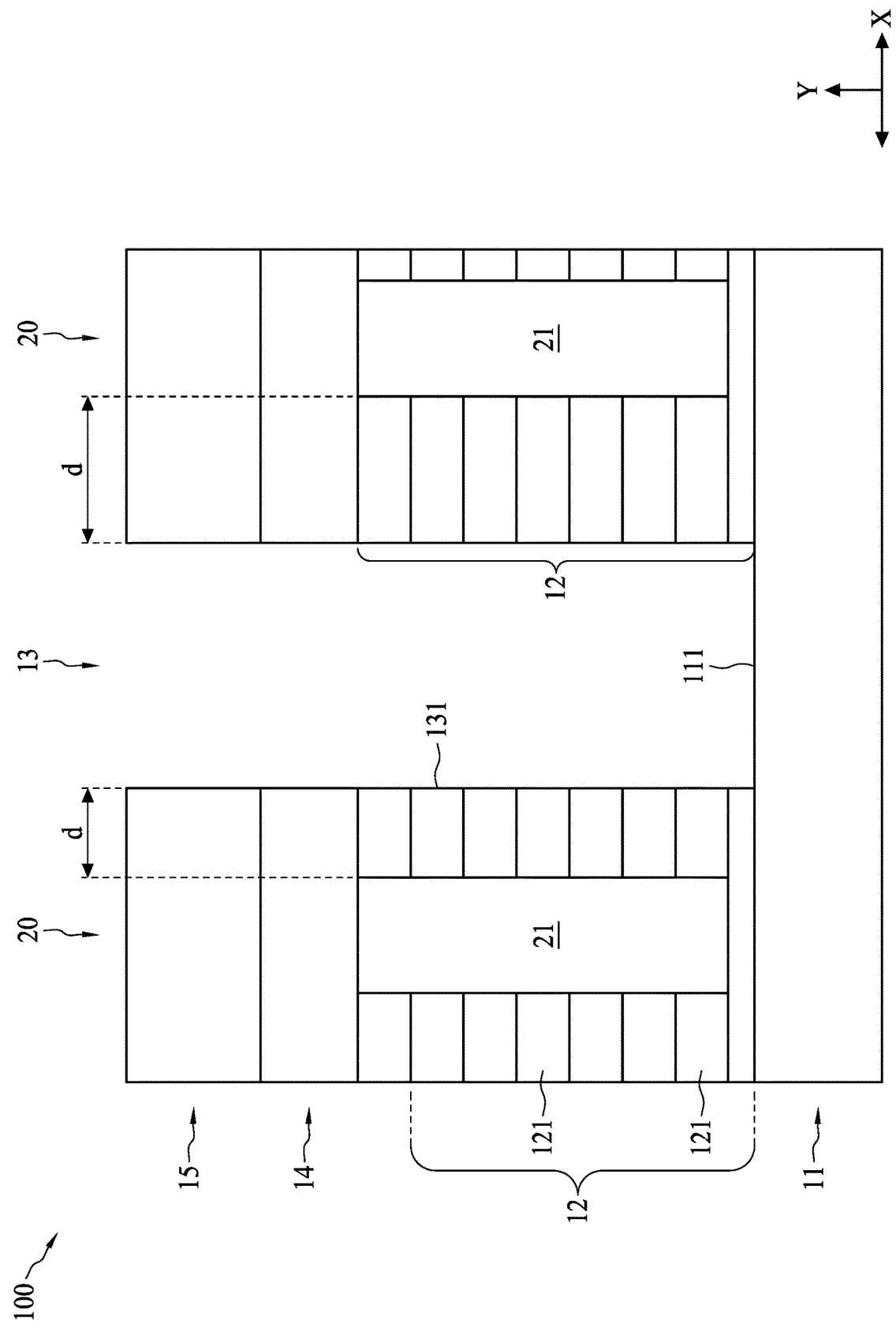
FIG. 4 is a cross-sectional view of a semiconductor device in accordance with some embodiments of the present disclosure.

FIGS. 3 and 4 are cross-sectional views illustrating semiconductor device according to aspects of the present disclosure in some embodiments. In some embodiments, referring to FIG. 3, the dielectric stack 12 includes a plurality of sublayers 121. The etch stopper 21 interfaces with more than two sublayers 121 of the dielectric stack 12, and partially separates a plurality of interfaces of the sublayers 121. In other words, the thickness of the etch stopper 21 along a second direction Y perpendicular to the semiconductive substrate 11 is not particularly limited. In some embodiments, the semiconductor device 100 includes a plurality of etch stoppers 21 in one dielectric stack 12, and each etch stopper 21 may have a different design according to actual needs.

In some embodiments, referring to FIG. 4, the etch stopper 21 is in contact with the semiconductive substrate 11 and extends to a top surface of the dielectric stack 12. Because the height of the etch stopper 21 along the second direction Y perpendicular to the semiconductive substrate 11 is the same as the height of the dielectric stack 12 along the second direction Y, the fluorine solution or other moisture may penetrate into an interface of two sublayers 121 of the dielectric stack 12, or the dielectric stack 12 may be excessively etched, and damage caused by the fluorine solution or the moisture may not be effectively controlled, regardless of which interface is penetrated or which dielectric stack 12 is over etched.

Figure 5:
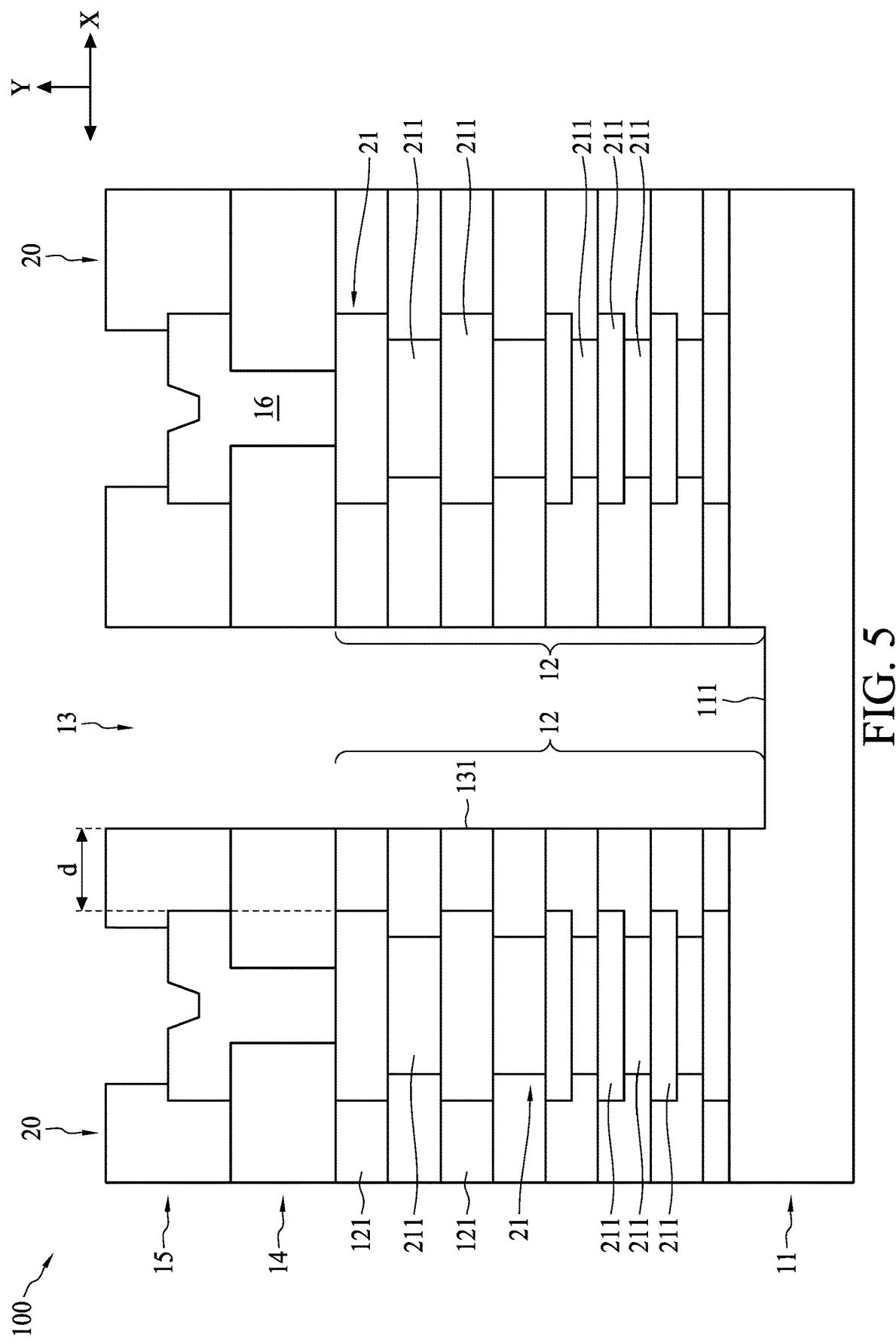
FIG. 5 is a cross-sectional view of a semiconductor device in accordance with some embodiments of the present disclosure.

FIG. 5 is a cross-sectional view of a semiconductor device according to aspects of the present disclosure in some embodiments. In some embodiments, referring to FIG. 5, the etch stopper 21 includes a plurality of interconnect layers 211. In some embodiments, the etch stopper 21 includes a plurality of connected interconnect layers 211, such that the interconnect layers 211 form an etch stopper stack.

Referring to FIGS. 2 to 5, in some embodiments, the semiconductor device 100 further includes a first passivation layer 14 disposed on the dielectric stack 12. In some embodiments, the first passivation layer 14 includes dielectric materials such as polyimide (PI), benzocyclobutene (BCB), polybenzoxazole (PBO), silicon nitride (SiN), silicon carbide (SiC), silicon oxide (SiO), silicon oxynitride (SiON), low-k dielectrics such as carbon doped oxides, extreme low-k dielectrics such as porous carbon doped silicon dioxide, or combinations thereof.

In some embodiments, the first passivation layer 14 includes silicon nitride (SiN). Silicon nitride has resistance to fluorine solution that is significantly better than that of silicon oxide (SiO). If silicon nitride is in contact with fluorine solution, the silicon nitride will not be damaged too seriously.

In some embodiments, the first passivation layer 14 includes silicon oxide (SiO). In order to address silicon oxide's low resistance to the fluorine solution, in some embodiments, as shown in FIG. 5, the waveguide structure 100 further includes a redistribution layer (RDL) 16. In some embodiments, the redistribution layer 16 is disposed over a top surface of the dielectric stack 12. In some embodiments, the redistribution layer 16 is embedded in the first passivation layer 14. In some embodiments, the redistribution layer 15 is embedded in the first passivation layer 14 and is in contact with the etch stopper 21. In some embodiments, the first passivation layer 14 is patterned in order to expose a portion of the redistribution layer 16, such that the exposed redistribution layer 16 may serve as an electrical contact, or may further receive or conductively connect to an element, such as a conductive bump. In some embodiments, the redistribution layer 16 includes conductive material such as gold (Au), silver (Ag), copper (Cu), nickel (Ni), tungsten (W), aluminum (Al), tin (Sn), tantalum (Ta), tantalum nitride (TaN), aluminium copper (AlCu) and/or alloys thereof.

In some embodiments, the semiconductor device 100 further includes a second passivation layer 15 disposed on the first passivation layer 14. In some embodiments, the second passivation layer 15 includes dielectric materials such as polyimide (PI), benzocyclobutene (BCB), polybenzoxazole (PBO), silicon nitride (SiN), silicon carbide (SiC), silicon oxide (SiO), silicon oxynitride (SiON), low-k dielectrics such as carbon doped oxides, extreme low-k dielectrics such as porous carbon doped silicon dioxide, or combinations thereof. The material of the second passivation layer 15 may be the same as or different from the first passivation layer 14. In some embodiments, the redistribution layer 16 extends through the first passivation layer 14 and the second passivation layer 15. In some embodiments, the second passivation layer 15 is patterned to expose a portion of the redistribution layer 16 embedded in the first passivation layer 14 and the second passivation layer 15, such that the exposed redistribution layer 16 may serve as an electrical contact, or may further receive or conductively connect to an element, such as a conductive bump.

Figure 6:
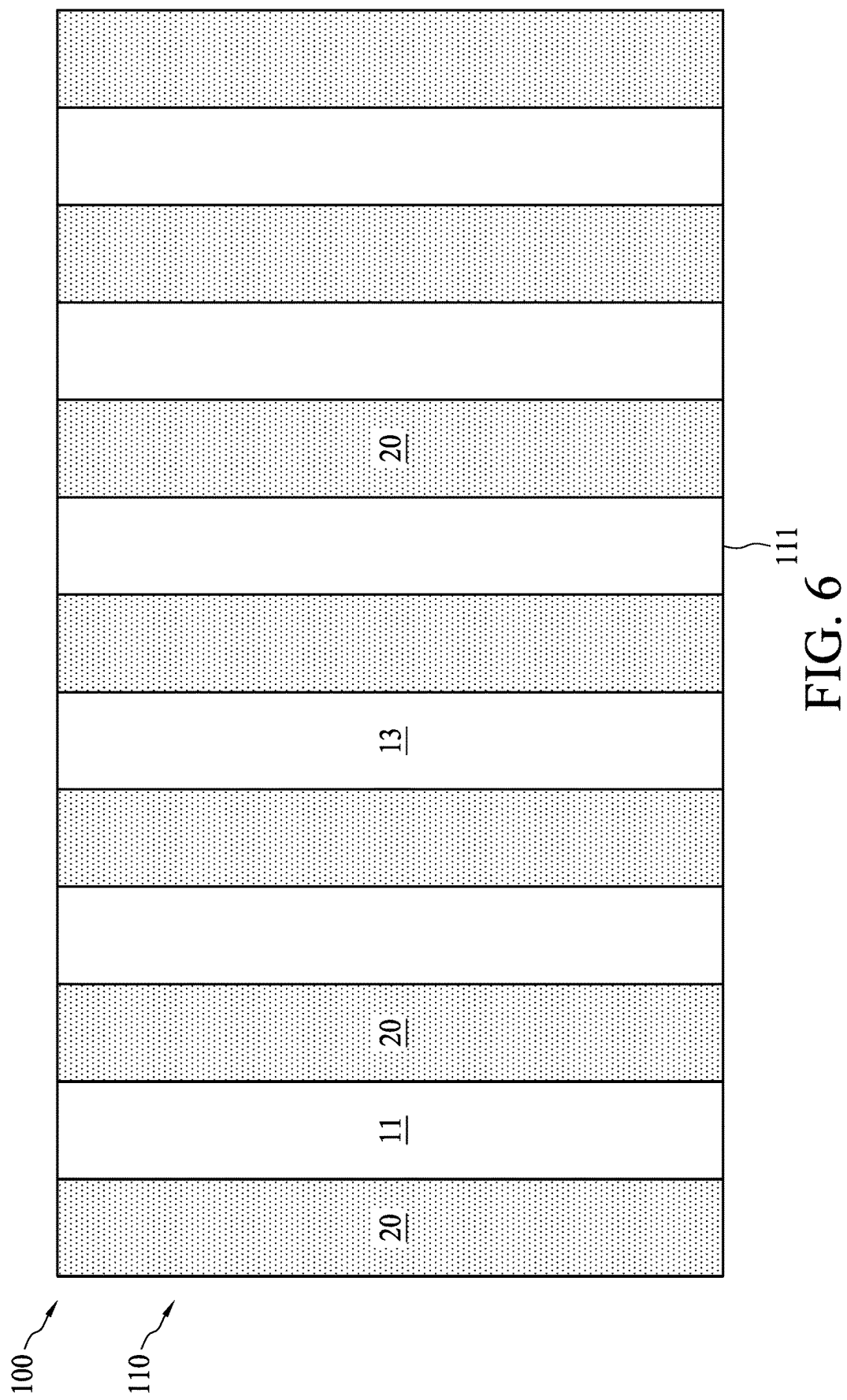
FIG. 6 is a top view of a semiconductor device in accordance with some embodiments of the present disclosure

FIG. 6 is a top view of a waveguide structure according to aspects of the present disclosure in some embodiments. Referring to FIG. 6 in conjunction with FIG. 2, a waveguide structure 100 of another embodiment is illustrated. The waveguide structure 100 includes an optical component 110. The optical component 110 includes a plurality of grating coupler teeth 20 over a semiconductive substrate 11 and a plurality of grating coupler openings 13 between adjacent grating coupler teeth 20. The grating coupler openings 13 are configured to receive a light wave. Each of the grating coupler teeth 20 includes a dielectric stack 12 and an etch stopper 21 embedded in the dielectric stack 12, wherein the etch stopper 21 has a resistance to a fluorine solution that is higher than that of the dielectric stack 12. In some embodiments, the optical component 110 is a grating coupler.

In some embodiments, the grating coupler teeth 20 have a slit-shaped pattern as seen from a top view. In some embodiments, the grating coupler openings 13 are narrow trenches when seen from the cross-sectional view. In some embodiments, the grating coupler teeth 20 have similar features. While the grating coupler teeth 20 are described as having similar features, such description is intended to be illustrative and is not intended to limit the embodiments, as the grating coupler teeth 20 may have similar structures or different structures in order to meet the desired functional requirements.

In some embodiments, the grating coupler openings 13 have similar features. While the grating coupler openings 13 are described as having similar features, such description is intended to be illustrative and is not intended to limit the embodiments, as the grating coupler openings 13 may have similar structures or different structures in order to meet the desired functional requirements.

In some embodiments, each of the grating coupler teeth 20 includes a dielectric stack 12 over the semiconductive substrate 11 to form a wall 131 of a grating coupler opening 13. In some embodiments, each of the grating coupler teeth 20 includes an etch stopper 21 interfacing with two sublayers 121 of the dielectric stack 12 and partially separating the interface of the two sublayers 121. In some embodiments, each of the grating coupler teeth 20 includes an etch stopper 21, that is, each wall 131 of the grating coupler openings 13 includes the etch stopper 21. In some embodiments, each grating coupler opening 13 is surrounded by the etch stopper 21.

In some embodiments, some of the grating coupler teeth 20 include the etch stopper 21. In some embodiments, only two grating coupler teeth are arranged so as to be parallel to an outer side, when viewed from above, of the optical component include an etch stopper 21.

In some embodiments, the optical component 110 couples the light wave from an out-of-plane fiber to a planar optical component 110, wherein the planar optical component 110 includes an in-plane taper to couple the light wave to a signal-mode photonic wire waveguide.

Figure 7:
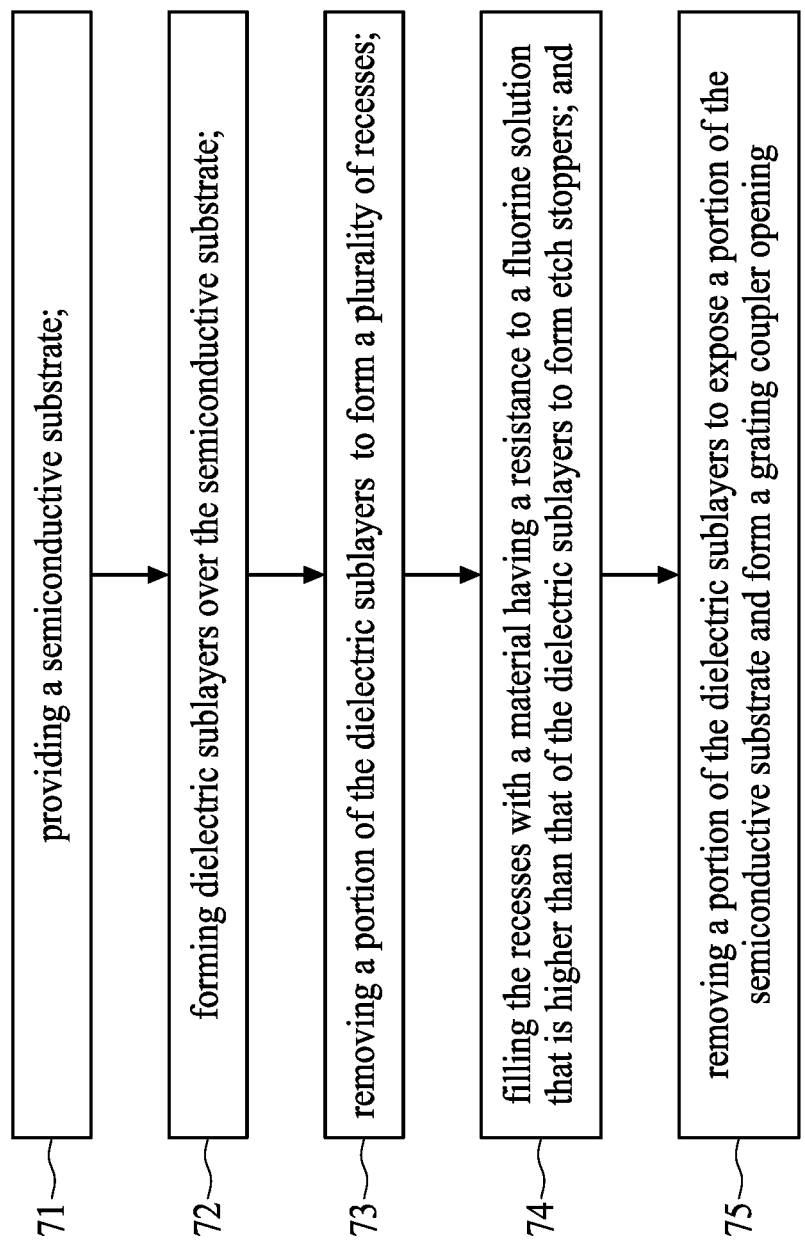
FIG. 7 is a flowchart representing a method of manufacturing a semiconductor device according to aspects of the present disclosure in one or more embodiments.

In the present disclosure, a method of manufacturing a semiconductor device is disclosed. In some embodiments, a semiconductor device is manufactured by the method. In some embodiments, a method of manufacturing a waveguide structure is disclosed. In some embodiments, a waveguide structure is manufactured by the method. The method includes a number of operations and the description and illustration are not deemed as a limitation of the sequence of the operations. FIG. 7 is a flowchart depicting an embodiment of the method of manufacturing the semiconductor device. The method includes operations 71, 72, 73, 74 and 75.

FIGS. 8 to 18 are cross-sectional views illustrating exemplary operations for manufacturing a semiconductor device of the present disclosure. In some embodiments, the operations of FIGS. 8 to 18 may be used to provide or manufacture the semiconductor device similar to the semiconductor device illustrated in FIG. 5.

Figure 8:
FIGS. 8-19 are cross-sectional views of a semiconductor device at various stages of manufacture in accordance with some embodiments of the present disclosure.

In operation 71, a semiconductive substrate 11 is provided as shown in FIG. 8. The semiconductive substrate 11 may be patterned using photolithography techniques.

Figure 9:
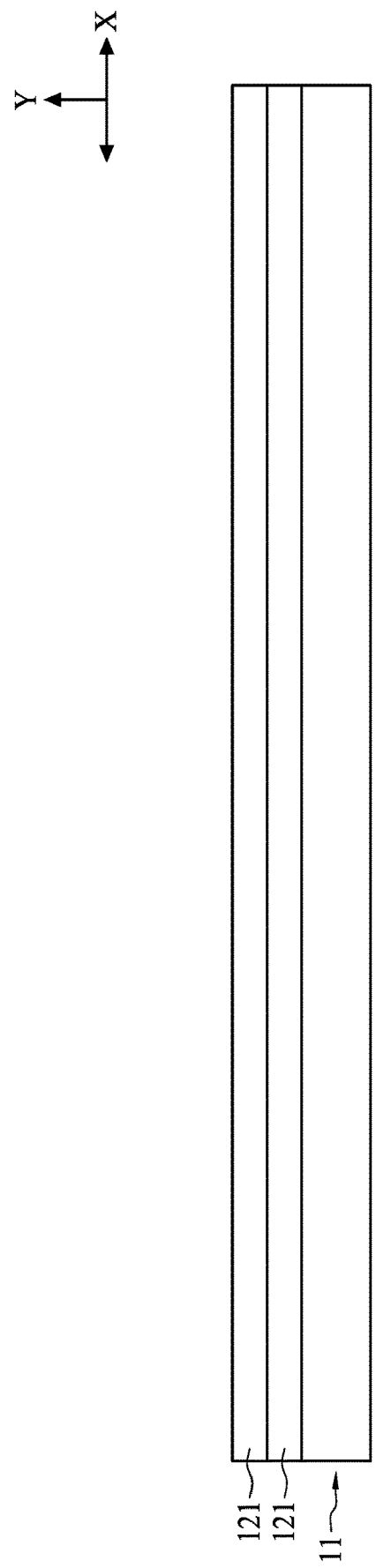

In operation 72, a dielectric sublayer 121 is formed over the semiconductive substrate 11 extending along the first direction X, and another dielectric sublayer 121 is formed on the dielectric sublayer 121 extending along the first direction X as shown in FIG. 9. In some embodiments, a plurality of dielectric sublayers 121 are formed over the semiconductive substrate 11.

Figure 10:
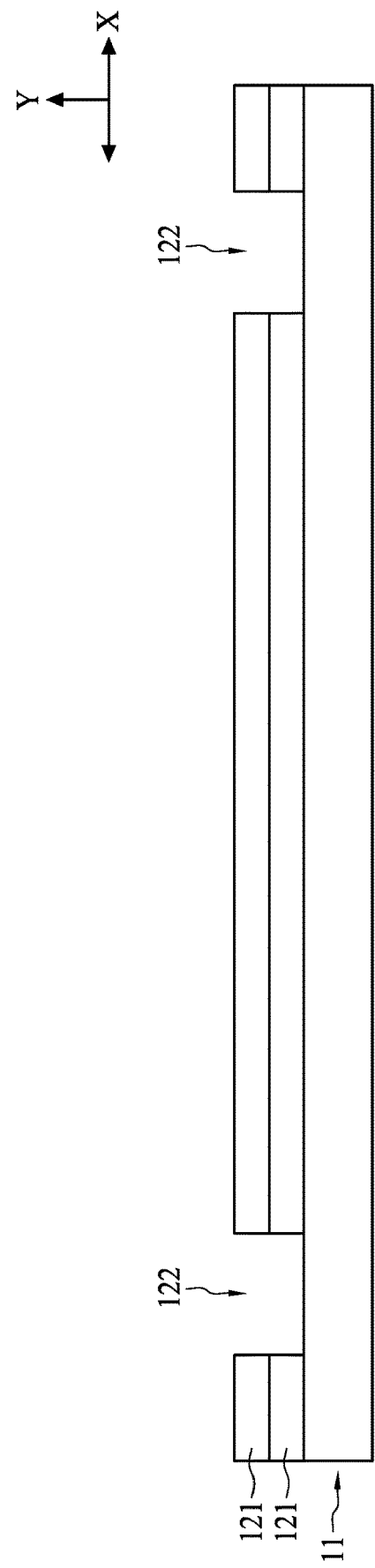

In operation 73, a plurality of recesses 122 are formed in the dielectric sublayers 121 as shown in FIG. 10. Each recess 122 penetrates the top dielectric sublayer 121. The recess 122 may be formed by removing portions of the top dielectric sublayer 121 to expose at least a portion of the underlying dielectric sublayer 121.

In some embodiments, a photoresist material (not shown) is formed over the top dielectric sublayer 121. The photoresist material is subsequently irradiated (exposed) and developed to remove a portion of the photoresist material. Next, the exposed portions of the dielectric sublayer 121 are removed using, for example, a suitable etching process to form the recesses 122.

Figure 11:
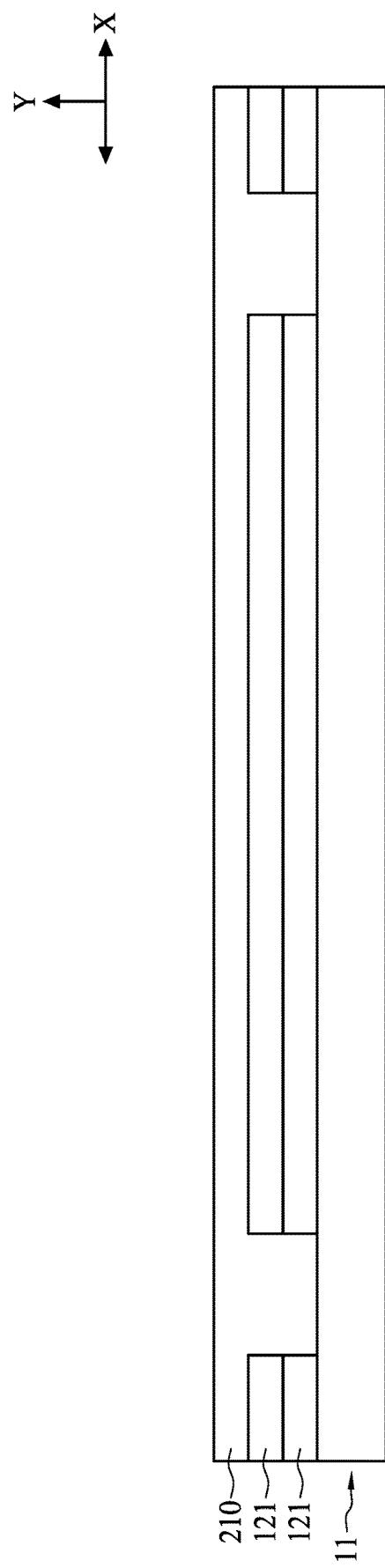

In operation 74, as shown in FIG. 11, recesses 122 are filled with a material having a resistance to a fluorine solution that is higher than that of the dielectric sublayers 121, thereby forming an etch stopper layer 210 on the dielectric sublayer 121 extending along the first direction X as shown in FIG. 11. The etch stopper layer 210 may be formed using an electro-chemical plating process, an electroless plating process, PVD, ALD, the like, or a combination thereof. The dielectric sublayer 121 is in contact with the etch stopper layer 210.

Figure 12:
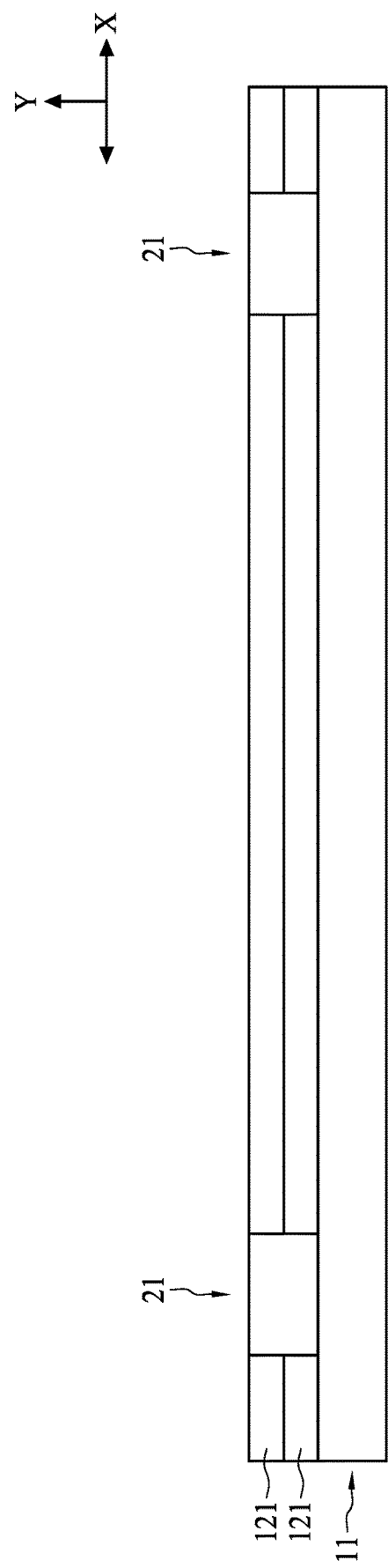

Further in operation 74, in some embodiments, the etch stoppers 21 are formed as shown in FIG. 12. The etch stoppers 21 may be formed by removing excess materials of the etch stopper layer 210 disposed on the dielectric sublayer 121 through a CMP or the like.

Figure 13:
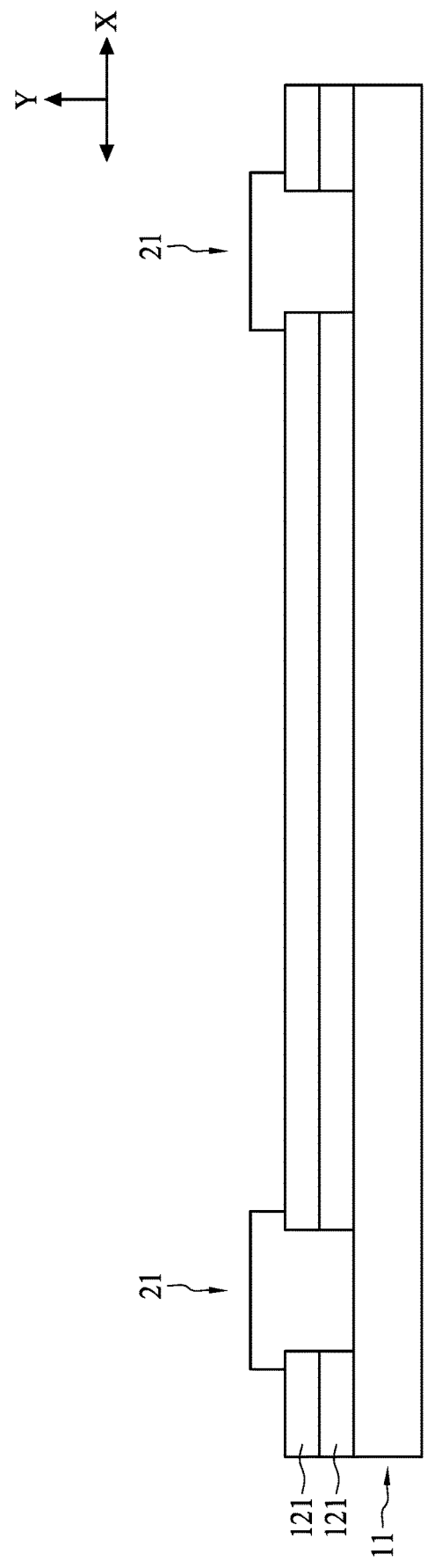

Further in operation 74, in some embodiments, the etch stoppers 21 are formed as shown in FIG. 13. The etch stoppers 21 may be formed by first depositing a photoresist (not shown) on the etch stopper layer 210. The photoresist may then be patterned to cover portions of the first conductor 110 where the etch stoppers 21 are desired to be located. Once the photoresist has been formed and patterned, portions of the etch stopper layer 210 not covered by the photoresist can be removed by a suitable etching process. Subsequently, after the removal of the photoresist, excess materials of the etch stopper layer 210 can be removed through a CMP or the like.

Figure 14:
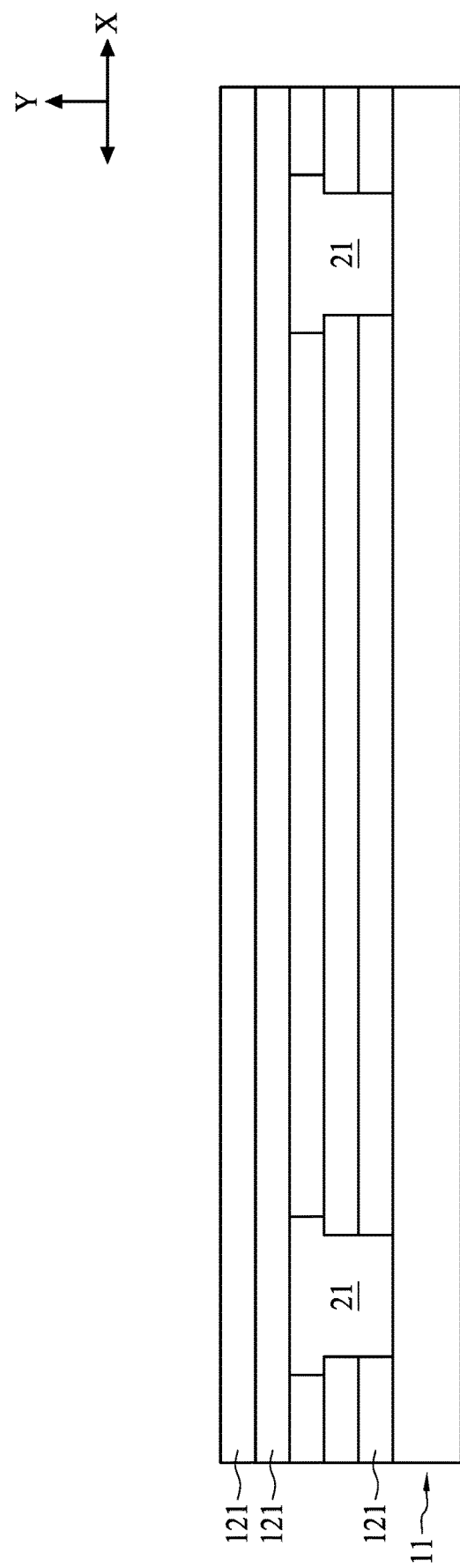
Figure 15:
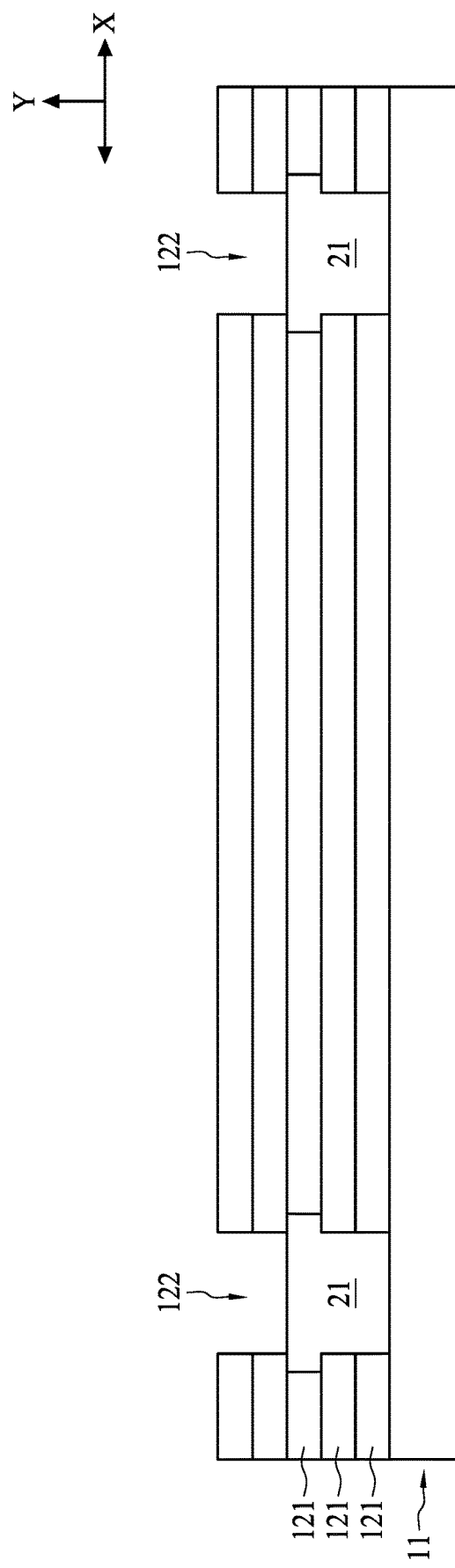
Figure 16:
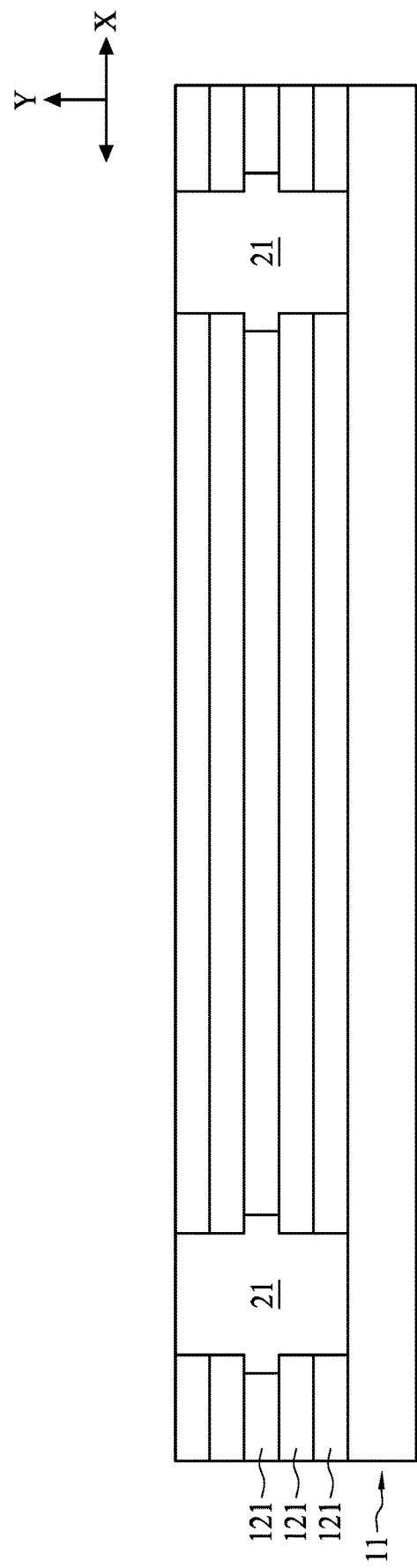

In some embodiments, more dielectric sublayers 121 are formed on the dielectric sublayers 121 and the etch stoppers 21 extending along the first direction X as shown in FIG. 14. In some embodiments, more recesses 122 are formed in the dielectric sublayers 121 as shown in FIG. 15. In some embodiments, as shown in FIG. 16, recesses 122 are filled with a material having a resistance to a fluorine solution that is higher than that of the dielectric sublayers 121 to form the etch stoppers 21.

Figure 17:
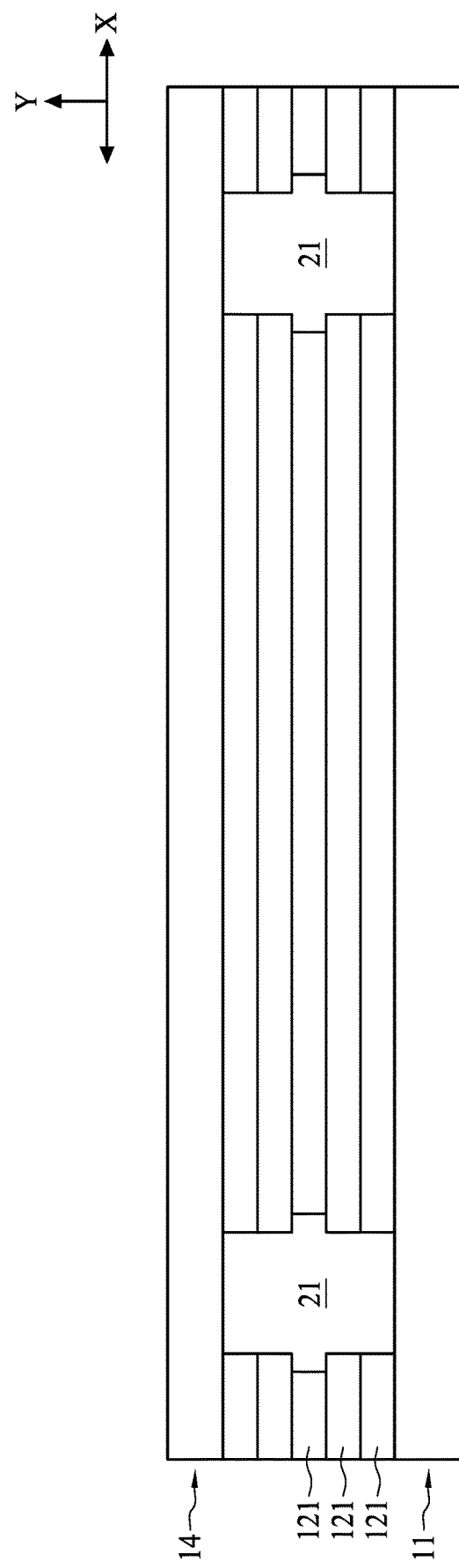
Figure 18:
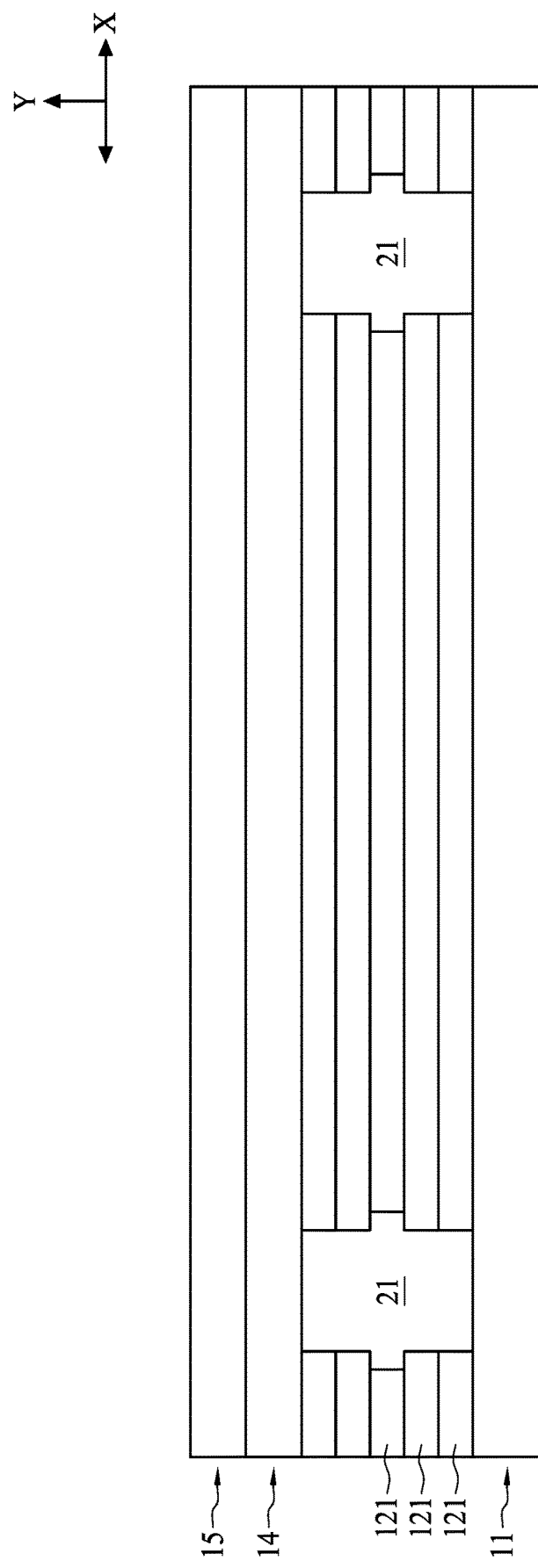

The method further includes the following operations. Referring to FIG. 17, the first passivation layer 14 extending along the first direction X is formed over the dielectric sublayers 121 and the etch stoppers 21. In some embodiments, referring to FIG. 18, a second passivation layer 15 extending along the first direction X is formed over the first passivation layer 14.

Figure 19:
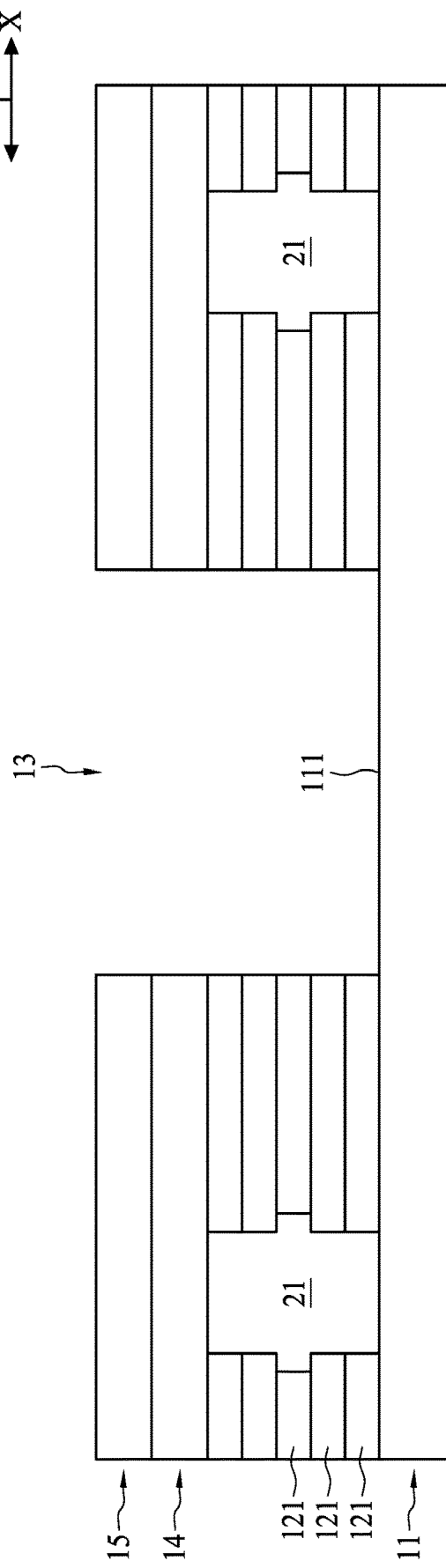

In operation 75, the grating coupler opening 13 is formed in the dielectric sublayers 121 as shown in FIG. 19. In some embodiments, a portion of the dielectric sublayers 121, the first passivation layer 14 and the second passivation layer 15 located between the etch stoppers 21 is removed to expose a portion 111 of the semiconductive substrate 11 and form a grating coupler opening 13. The grating coupler opening 13 thus formed penetrates portions of the dielectric sublayers 121 along the second direction Y, and two dielectric stacks 12 over the semiconductive substrate 11 are formed. In some embodiments, the grating coupler opening 13 may be formed by removing portions of the dielectric sublayers 121 to expose at least a portion 111 of the semiconductive substrate 11.

In some embodiments, a photoresist material (not shown) is formed over the second passivation layer 15. The photoresist material is subsequently irradiated (exposed) and developed to remove a portion of the photoresist material. Subsequently, the exposed portions of the second passivation layer 15 are removed using, for example, a suitable etching process to form the grating coupler opening 13.

In some embodiments, a method of manufacturing a semiconductor device is integrated into a method of manufacturing dies without modifying the in-foundry process flow and with minimal post-foundry processing. In some embodiments, a method of manufacturing a waveguide structure is integrated into a method of manufacturing dies without extra processes but only modifying the mask. In some embodiments, the waveguide structure is manufactured between the dies on a wafer.

Figure 20:
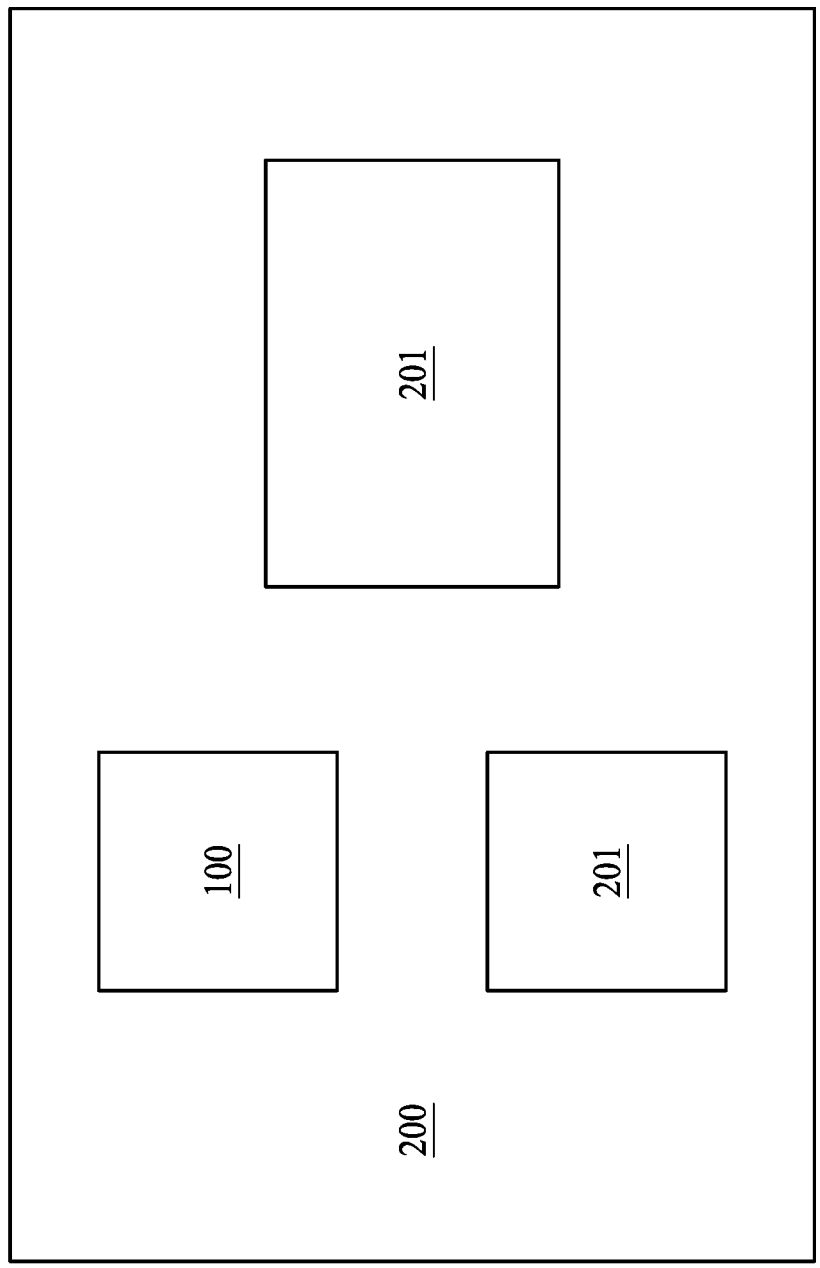
FIG. 20 is a schematic view illustrating a chip including a semiconductor device manufactured by a method of manufacturing a semiconductor device according to aspects of the present disclosure in one or more embodiments.

FIG. 20 is a schematic view illustrating a chip including the semiconductor device manufactured by the method of the present disclosure. In some embodiments, as shown in FIG. 20, the method manufactures the semiconductor device 100 in a portion of a chip 200. In some embodiments, other portions of the chip 200 may be used to prepare other devices 201, such as an active circuit, an application-specific integrated circuit (ASIC), or a transistor. In some embodiments, the semiconductor device 100 and other devices 201 are manufactured simultaneously.

Accordingly, the present disclosure therefore provides a semiconductor device, a waveguide structure, and a method of manufacturing a waveguide structure. The semiconductor device includes a semiconductive substrate, a dielectric stack, and an etch stopper. The dielectric stack is formed over the semiconductive substrate to form a wall of a grating coupler opening. The etch stopper interfaces with two sublayers of the dielectric stack and partially separates the interface of the two sublayers, wherein the etch stopper has a resistance to a fluorine solution that is higher than that of the two sublayers. Consequently, the etch stopper can prevent and/or stop the fluorine solution or moisture from penetrating or etching into the dielectric stack.

Some embodiments of the present disclosure provide a semiconductor device including a semiconductive substrate, a dielectric stack over the semiconductive substrate to form a wall of a grating coupler opening, and an etch stopper interfacing with two sublayers of the dielectric stack and partially separating the interface of the two sublayers. The etch stopper has a resistance to a fluorine solution that is higher than that of the two sublayers.

Some embodiments of the present disclosure provide a waveguide structure including an optical component. The optical component includes a plurality of grating coupler teeth over a semiconductive substrate and a plurality of grating coupler openings between adjacent grating coupler teeth, wherein the grating coupler openings are configured to receive a light wave. Each of the grating coupler teeth includes a dielectric stack and an etch stopper embedded in the dielectric stack, wherein the etch stopper has a resistance to a fluorine solution that is higher than that of the dielectric stack.

Some embodiments of the present disclosure provide a method of manufacturing a semiconductor device. The method includes providing a semiconductive substrate; forming a plurality of dielectric sublayers over the semiconductive substrate; removing portions of the dielectric sublayers to form a plurality of recesses; filling the recesses with a material having a resistance to a fluorine solution that is higher than that of the dielectric sublayers to form etch stoppers; and removing a portion of the dielectric sublayers to expose a portion of the semiconductive substrate and form a grating coupler opening.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
    a semiconductive substrate, wherein the semiconductive substrate includes an inter-layer dielectric (ILD);
    a dielectric stack disposed over the semiconductive substrate to form a wall of a grating coupler opening; and
    an etch stopper interfacing with two sublayers of the dielectric stack, wherein the etch stopper is surrounded by the dielectric stack along a direction different from a stacking direction of the dielectric stack, and the etch stopper has a resistance to a fluorine solution that is higher than that of the two sublayers.

2. The semiconductor device of claim 1, wherein the dielectric stack includes silicon oxide.

3. The semiconductor device of claim 1, further comprising a first passivation layer disposed on the dielectric stack.

4. The semiconductor device of claim 3, wherein the first passivation layer includes silicon nitride.

5. The semiconductor device of claim 1, wherein the etch stopper includes metal.

6. The semiconductor device of claim 1, wherein the grating coupler opening exposes a portion of the semiconductive substrate.

7. The semiconductor device of claim 1, wherein the distance between the etch stopper and the wall of the grating coupler opening along a first direction parallel to the semiconductive substrate is between 0.5 and 10 microns.

8. The semiconductor device of claim 1, wherein the maximum width of the etch stopper along a first direction parallel to the semiconductive substrate is between 2 and 3 microns.

9. The semiconductor device of claim 1, wherein the etch stopper includes a plurality of interconnect layers.

10. The semiconductor device of claim 1, wherein the semiconductor device is configured to serve as a waveguide structure.

11. The semiconductor device of claim 1, wherein the etch stopper is in contact with the semiconductive substrate and extends to a top surface of the dielectric stack.

12. A semiconductor device, comprising:
    a semiconductive substrate;
    a plurality of grating coupler teeth over a semiconductive substrate, wherein each of the grating coupler teeth includes a dielectric stack, an etch stopper embedded in the dielectric stack and a first passivation layer disposed on the dielectric stack, the etch stopper has a resistance to a fluorine solution that is higher than that of the dielectric stack;

a plurality of grating coupler openings between adjacent grating coupler teeth, wherein the grating coupler openings are configured to receive a light wave; and a redistribution layer (RDL) embedded in the first passivation layer, wherein the first passivation layer includes silicon oxide.

13. The semiconductor device of claim 12, wherein the etch stopper penetrates through two sublayers of the dielectric stack.

14. The semiconductor device of claim 12, wherein the etch stopper is adjacent to the semiconductive substrate and extends to a top surface of the dielectric stack.

15. A semiconductor device, comprising:
a semiconductive substrate;
a dielectric stack disposed over the semiconductive substrate to form a wall of a grating coupler opening, wherein the dielectric stack includes a plurality of sublayers; and
an etch stopper embedded in the dielectric stack, the etch stopper including a plurality of interconnect layers, each interconnect layers interfacing with two sublayers of the dielectric stack and partially separating the interface of the two sublayers, wherein the etch stopper has a resistance to a fluorine solution that is higher than that of the two sublayers.

16. The semiconductor device of claim 15, wherein the interconnect layers of the etch stopper are connected.

17. The semiconductor device of claim 15, wherein at least one of the interconnect layers interfaces with more than two sublayers of the dielectric stack and partially separating the interfaces of the sublayers.

18. The semiconductor device of claim 15, further comprising a passivation layer disposed on the dielectric stack and a redistribution layer embedded in the passivation layer, wherein the redistribution layer is in contact with the etch stopper.

19. The semiconductor device of claim 12, wherein the grating coupler teeth further includes a second passivation layer disposed on the first passivation layer.

20. The semiconductor device of claim 12, wherein the etch stopper is separated from the grating coupler openings.

* * * * *